July 16, 1963 J. B. BRAUER 3,098,204

MICROWAVE DELAY LINE AND METHOD OF FABRICATION

Filed April 24, 1961

INVENTOR.
JOSEPH B. BRAUER
BY Wade Koontz and
Willard R. Matthews Jr.
ATTORNEYS 3,098,204

MICROWAVE DELAY LINE AND METHOD OF FABRICATION

Joseph B. Brauer, Rome, N.Y., assignor to the United States of America as represented by the Secretary of the Air Force Filed Apr. 24, 1961, Ser. No. 105,241
1 Claim. (Cl. 333—30)
(Granted under Title 35, U.S. Code (1952), sec. 266)

The invention described herein may be manufactured and used by or for the United States Government for governmental purposes without payment to me of any royalty thereon.

This invention relates in general to electrical current delay lines, and more particularly to a microwave delay line of piezoelectric material having, as an integral part thereof, input and output transducers.

There are various types of piezoelectric transducers and delay lines known in the prior art. All of such known devices, however, have a limited frequency range due to the precision requirements of their fabrication. For example, a fabrication technique currently employed to eliminate reflections and refractions in a delay line of the type comprehended herein comprises restricting the delay line diameter to one-fourth of the wavelength of the transmitted impulses. The impractibility of such a technique at microwave frequencies is apparent when one considers the fact that the acoustic wavelength in solids at a frequency of 10,000 megacycles per second ($x$ band) is approximately 5000 angstroms or 0.005 cm. Therefore, assuming that a piezoelectric transducer could be cut small enough to provide the fundamental, or lower order harmonics at such a frequency, the precision required would be about twenty-five times closer than that which is usually termed optical tolerance. The composite nature of the delay lines reflected by the present state of the art poses the further problem of excessive losses and spurious signals generated in the bonds between the delay media and the input and output transducers.

Accordingly, it is the principal object of this invention to provide a delay line of the type described that is adapted to propagate signals at microwave frequencies.

It is another principal object of this invention to provide a microwave delay line having, as an integral part thereof, input and output transducers, said transducers and delay media being fabricated from a single piezoelectric crystal.

Another object of this invention is to provide a novel method for fabricating a microwave delay line.

Still another object of this invention is to provide a microwave delay line having input and output transducers, as an integral part thereof, said microwave delay line being designed to eliminate spurious signals and internal losses.

Yet another object of this invention is to provide a microwave delay line of the type described, said delay line being fabricated from a single fused quartz crystal.

Still another object of this invention is to provide a microwave delay line of the type described, said delay line being fabricated from a single Rochelle salt crystal.

Still another object of this invention is to provide a microwave delay line comprising input and output transducers and a filamentary delay media fabricated from a single piezoelectric crystal, said filamentary delay media being in the form of a coil.

These and other advantages, features and objects of my invention will become more apparent from the following descriptions taken in conjunction with the illustrative embodiments in the accompanying drawings, wherein.

Basically, my invention comprehends a microwave delay line having input and output transducers, as an integral part thereof, wherein a single homogeneous piezoelectric crystal is used throughout for both transducers and delay media. It is the use of a crystal media which in itself is capable of serving as a transducer when properly oriented and fed from a microwave cavity that extends the useful frequency range of such a delay line from the ultrasonic range up to the limit where the wavelength of the propagating signal approaches the unit cell dimensions of the crystal lattice.

The present invention has application chiefly to pulsed radar systems, digital computers, and other military uses where microwave signals are subjected to millesecond time delays. A specific example of such an application is the cross correlating technique used in radar range finding in which signals, as received, are compared with later received signals by artificially delaying the former after their receipt.

Figure 1:
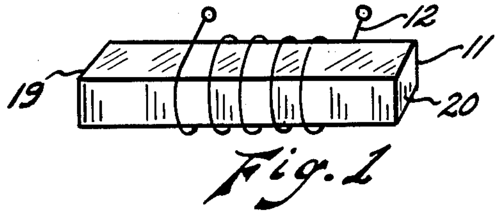
FIG. 1 illustrates one method of fabricating a delay line in accordance with the principles of my invention.
Figure 2:
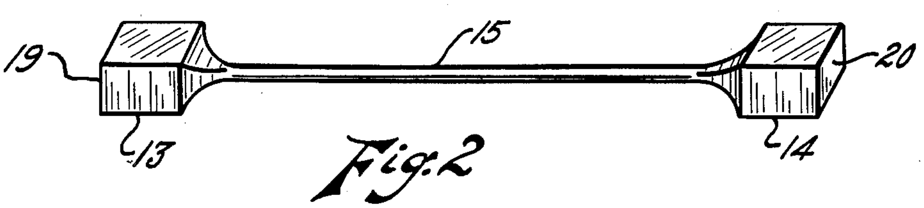
FIG. 2 illustrates one embodiment of my invention.

Referring now to FIG. 1 there is illustrated a piezoelectric crystal 11, such as fused quartz or Rochelle salt, together with heating coil 12. Crystal 11 is cut such that its crystallographic $x$-axis is perpendicular to faces 19 and 20, and its transducer dimensions are compatible with the frequency to be propagated. The center section of crystal 11 is then heated locally by heating coil 12 until it reaches its working, or melting temperature. Care must be taken to thermally isolate the end portions so that they retain their nature and orientation. The center section of crystal 11 is then drawn into a filament as illustrated by delay media 15 in FIG. 2. The length of said delay media 15 is determined by the desired time delay. Transducers 13 and 14, then, become an integral part of delay media 15 without the necessity of a bond or seal therebetween.

Figure 3:
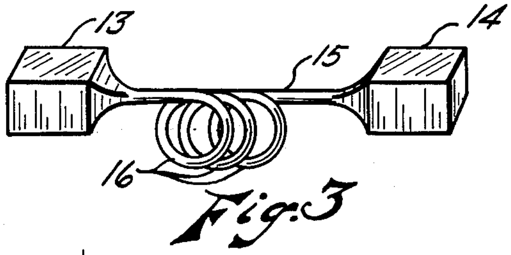
FIG. 3 illustrates another embodiment of my invention.

A further refinement of my invention is illustrated in FIG. 3 wherein said delay media has been wound into a plurality of helical loops 16. Such an arrangement provides greater time delay in a more restricted physical space.

Figure 4:
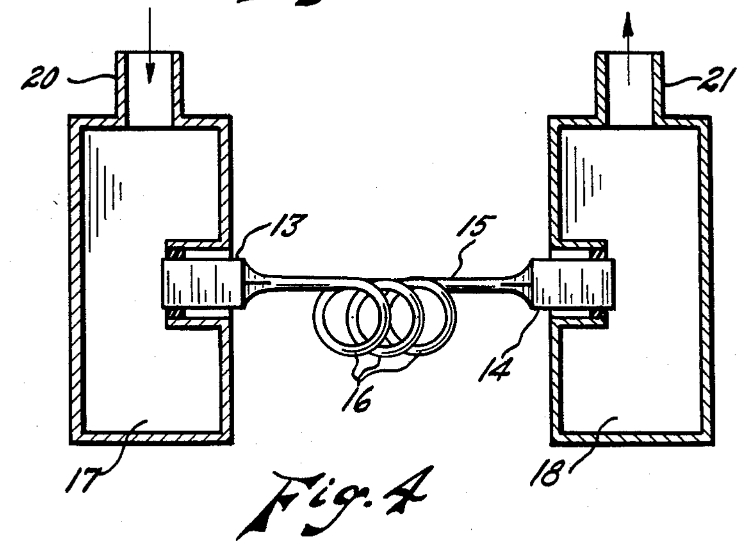
FIG. 4 illustrates one embodiment of my invention in combination with input and output means.

FIG. 4 illustrates one application of the subject delay line. Tuned cavities 17 and 18, together with input waveguide 20, and output waveguide 21, provide input and output means for the subject delay line.

While my invention, by way of illustration, has been thus described with reference to one presently prepared embodiment, it is not intended to be limited thereto. Those skilled in the art will readily recognize that many variations of the basic idea will suggest themselves without departing from the spirit or scope of the invention. As an example, any piezoelectric material that will serve as a good delay media and transducer may be used instead of quartz. Furthermore, it should be apparent that the local heating of the center section of the original crystal may be accomplished by resistance, induction or dielectric heating, and that the heating element may be shaped to provide exactly the desired heat gradient to control filament size and taper. These and other similar modifications and alterations are deemed to be within the scope of the appended claim.

What is claimed is:

A microwave delay circuit comprising an input transducer, an output transducer, and a delay medium disposed therebetween, said input and output transducer and said delay medium being fabricated from a single piezoelectric crystal, said input transducer being adapted to generate mechanical vibrations in response to an electromagnetic microwave input, said delay medium being adapted to propagate said mechanical vibrations and said output transducer being adapted to generate an electromagnetic microwave output responsive to said mechanical vibrations, said delay medium being filamentary in form and consisting of a plurality of helical loops and having a length such that the time required for said mechanical vibrations to pass therealong is equal to the desired delay time.

References Cited in the file of this patent

UNITED STATES PATENTS

| | | |
|---|---|---|
| 1,852,795 | Wegal | Apr. 5, 1932 |
| 2,137,852 | Nicolson | Nov. 22, 1938 |
| 2,759,241 | Strum | Aug. 21, 1956 |
| 2,765,446 | Martin | Oct. 2, 1956 |
| 2,828,470 | Mason | Mar. 25, 1958 |
| 2,861,320 | Gravley | Nov. 25, 1958 |
| 2,883,660 | Arenberg | Apr. 21, 1959 |
| 2,894,222 | Goldan | July 7, 1959 |
| 3,012,204 | Dransfeld et al. | Dec. 5, 1961 |
| 3,012,211 | Mason | Dec. 5, 1961 |
| 3,037,174 | Bommel et al. | May 29, 1962 |